(12) United States Patent
Saito

(10) Patent No.: US 10,067,470 B2
(45) Date of Patent: Sep. 4, 2018

(54) VOLUME HOLOGRAPHIC ELEMENT, VOLUME HOLOGRAPHIC ELEMENT MANUFACTURING METHOD, AND DISPLAY DEVICE

(71) Applicant: SEIKO EPSON CORPORATION, Tokyo (JP)

(72) Inventor: Atsushi Saito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 219 days.

(21) Appl. No.: 15/058,541

(22) Filed: Mar. 2, 2016

(65) Prior Publication Data
US 2016/0291543 A1    Oct. 6, 2016

(30) Foreign Application Priority Data
Mar. 30, 2015  (JP) .................. 2015-068267

(51) Int. Cl.
*G03H 1/02*  (2006.01)
*G02B 1/11*  (2015.01)
(Continued)

(52) U.S. Cl.
CPC ....... *G03H 1/0248* (2013.01); *G02B 27/0172* (2013.01); *G03H 1/0252* (2013.01); *G03H 1/0486* (2013.01); *G02B 1/11* (2013.01); *G02B 2027/0105* (2013.01); *G02B 2027/0109* (2013.01); *G02B 2027/0174* (2013.01); (Continued)

(58) Field of Classification Search
CPC .. G03H 1/0402; G03H 1/0248; G03H 1/0486; G03H 1/0252; G03H 2250/32; G03H 2001/0439; G03H 2001/0415; G03H 2001/043; G02B 27/0172;
(Continued)

(56) References Cited

U.S. PATENT DOCUMENTS 4,367,911 A * 1/1983 Graube .................. G03C 1/66
  359/3
5,726,782 A * 3/1998 Kato ...................... G02B 5/32
  359/13
(Continued)

FOREIGN PATENT DOCUMENTS

EP    521296 A1    1/1993
GB    2260420 A    4/1993
(Continued)

*Primary Examiner* — Bumsuk Won
*Assistant Examiner* — Henry Duong
(74) *Attorney, Agent, or Firm* — Oliff PLC

(57) ABSTRACT

In a process of manufacturing the volume holographic element, a holographic material layer is irradiated with reference light from the side of a second substrate in the oblique direction, and the holographic material layer is vertically irradiated with object light from the side of a first substrate in an interference exposure process. Since a first translucent anti-reflective layer is formed on the first surface of the first substrate, it is difficult that a situation in which the reference light is reflected in the first surface in the oblique direction occurs. In addition, since a second translucent anti-reflective layer is formed on the second surface of the second substrate, it is difficult that a situation in which the object light is reflected in the second surface occurs.

16 Claims, 11 Drawing Sheets

(51) Int. Cl.
  *G03H 1/04* (2006.01)
  *G02B 27/01* (2006.01)
(52) U.S. Cl.
  CPC ............... *G03H 2001/043* (2013.01); *G03H 2001/0415* (2013.01); *G03H 2001/0439* (2013.01); *G03H 2250/32* (2013.01)
(58) Field of Classification Search
  CPC .... G02B 2027/0109; G02B 2027/0105; G02B 2027/0174; G02B 1/11
  USPC ............................................................ 359/8
  See application file for complete search history.

(56) References Cited

U.S. PATENT DOCUMENTS

| | | | | |
|---|---|---|---|---|
| 2006/0063351 A1* | 3/2006 | Jain | ................. | G02F 1/1362 438/455 |
| 2011/0248904 A1* | 10/2011 | Miyawaki | ............ | G02B 27/017 345/7 |

FOREIGN PATENT DOCUMENTS

| | | |
|---|---|---|
| JP | H05-181400 A | 7/1993 |
| JP | H06-258996 A | 9/1994 |
| JP | H07-234627 A | 9/1995 |

\* cited by examiner

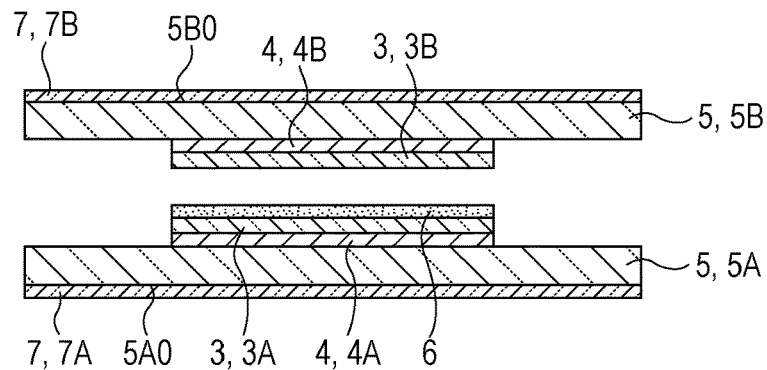
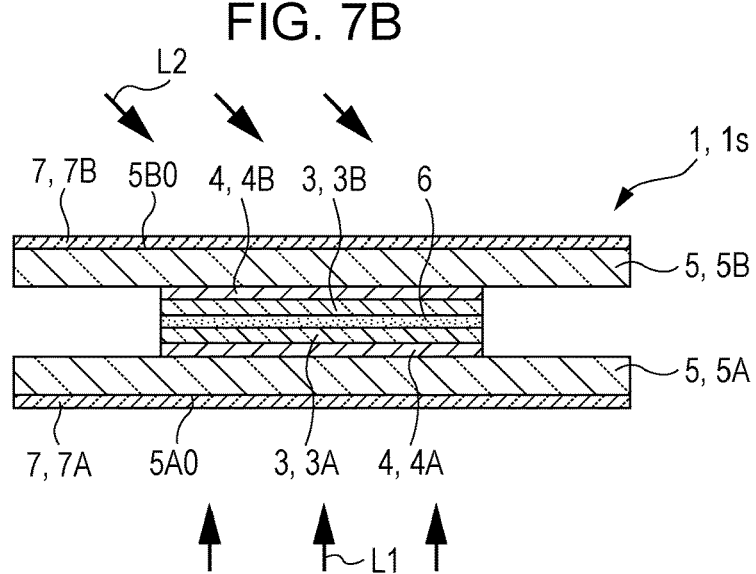
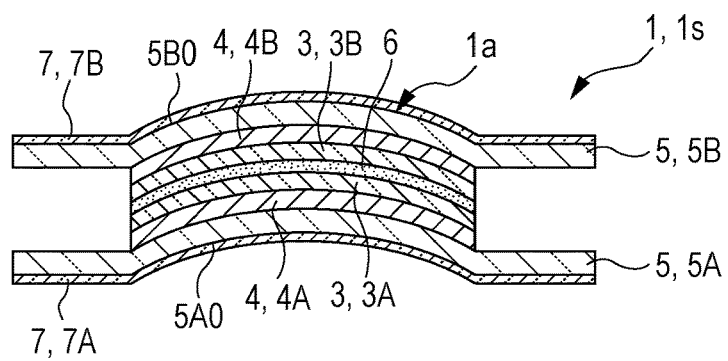

US 10,067,470 B2

VOLUME HOLOGRAPHIC ELEMENT, VOLUME HOLOGRAPHIC ELEMENT MANUFACTURING METHOD, AND DISPLAY DEVICE

BACKGROUND

1. Technical Field

The present disclosure relates to a volume holographic element, a volume holographic element manufacturing method, and a display device.

2. Related Art

In a volume holographic element, a configuration, in which a first substrate 5A, a holographic material layer 4, an adhesion layer 6 (intermediate layer), and a second substrate 5B are sequentially laminated, has been proposed (refer to JP-A-7-234627), as illustrated in FIG. 11. When a volume holographic element having the above-described configuration is manufactured, interference exposure is performed in such a way that the holographic material layer 4 in an uncured state or in a semi-cured state is irradiated with object light L1 and reference light L2, which are acquired by dividing light flux emitted from a common light source, parts which have different refractive indexes are formed in the shape of stripes in the holographic material layer 4 in the interference exposure process, and then the holographic material layer 4 is cured in a curing process.

However, in the interference exposure process, some of the exposure light is reflected in the interface between the first surface 5A0 of a first substrate 5A, which is a surface opposite to the holographic material layer 4, and an air layer, or in the interface between the second surface 5B0 of a second substrate 5B, which is a surface opposite to the holographic material layer 4, and an air layer, and thus interference fringes are generated in locations other than a predetermined location. Therefore, there is a problem in that it is difficult to appropriately form stripes having different refractive indexes (diffraction grid) in the holographic material layer 4. For example, when the reference light L2 is irradiated from the side of the second substrate 5B in the oblique direction, some of the reference light L2 is obliquely reflected in the interface between the first surface 5A0 of the first substrate 5A and the air layer, and thus the interference fringes are generated in locations other than the predetermined location of the holographic material layer 4, as expressed by arrow L20. Meanwhile, the object light L1, which is vertically irradiated from the side of the first substrate 5A, is vertically reflected in the interface between the second surface 5B0 of the second substrate 5B and the air layer. However, when the reflection direction of the reflected light is obliquely inclined, it causes the interference fringes to be generated in locations other than the predetermined location.

SUMMARY

An advantage of some embodiments is to provide a volume holographic element, which is capable of suppressing the generation of unnecessary interference fringes due to reflection in the interface between a substrate and an air layer when interference exposure is performed, a volume holographic element manufacturing method, and a display device using the volume holographic element.

According to some embodiments, there is provided a volume holographic element including a first translucent substrate, a second translucent substrate that faces the first translucent substrate, a first holographic material layer that is arranged between the first substrate and the second substrate, and a first translucent anti-reflective layer that is arranged on a first surface of the first translucent substrate, the first surface is a surface opposite to the first holographic material layer.

In the volume holographic element according to some embodiments, the first translucent anti-reflective layer is laminated on the first surface of the first translucent substrate. Therefore, when holographic material layer is irradiated with the exposure light, which includes object light or reference light, from the side opposite to the first translucent substrate in a volume holographic element manufacturing process, it is difficult that the exposure light is obliquely reflected in the first surface of the first translucent substrate. Accordingly, when exposure is performed, it is possible to suppress the generation of interference fringes in locations other than the predetermined location of the holographic material layer. Therefore, since it is possible to appropriately form stripes having different refractive indexes (diffraction grids), it is possible to suppress the deterioration of diffraction characteristics due to unnecessary stripes (diffraction grids).

According to some embodiments, it is preferable that the volume holographic element further includes a second translucent anti-reflective layer that is arranged on a second surface of the second translucent substrate, the second surface is a surface opposite to the first holographic material layer. In this case, in the volume holographic element manufacturing process, it is difficult that the exposure light, which is irradiated for the holographic material layer from the side of the first translucent substrate, is reflected in the interface between the second translucent substrate and the air layer when exposure is performed, and thus it is possible to suppress the generation of interference fringes in locations other than the predetermined location of the holographic material layer. Accordingly, since it is possible to appropriately form stripes having different refractive indexes (diffraction grids), it is possible to suppress the deterioration of diffraction characteristics due to unnecessary stripes (diffraction grids).

According to some embodiments, the volume holographic element may further include a bending section in which the first holographic material layer, the first translucent substrate, and the second translucent substrate are bent on one side of a thickness direction.

According to some embodiments, the volume holographic element may further include: a first translucent film that is arranged between the second translucent substrate and the first holographic material layer; and a first translucent adhesion layer that is arranged between the second translucent substrate and the first translucent film.

According to some embodiments, the volume holographic element may further including a second holographic material layer that is arranged between the second translucent substrate and the first holographic material layer, and a first translucent film that is arranged between the first holographic material layer and the second holographic material layer. In this case, it is possible to laminate the holographic material layer and the film between the first translucent substrate and the second translucent substrate in order that is symmetric in the thickness direction. Therefore, even though expansion or contraction is generated in the holographic material layer, and stress is added to the volume holographic element when the holographic material layer is exposed or when the holographic material layer is cured, the stress is cancelled out on one side and the other side of the thickness direction for the center of the volume holographic element in the thickness direction in the volume holographic element manufacturing process. Accordingly, it is possible to suppress the bending of the volume holographic element. Therefore, it is possible to appropriately form stripes having different refractive indexes (diffraction grids) in the volume holographic element.

According to some embodiments, the volume holographic element may further including a second translucent film that is arranged between the second holographic material layer and the first translucent film, and a first translucent adhesion layer that is arranged between the first translucent film and the second translucent film. In this case, it is possible to laminate the holographic material layer, the adhesive layer, and the film between the first translucent substrate and the second translucent substrate in order that that is symmetric in the thickness direction. Therefore, in the volume holographic element manufacturing process, even though expansion or contraction is generated in the holographic material layer, and stress is added to the volume holographic element when the holographic material layer is exposed or when the holographic material layer is cured, the stress is cancelled out on one side and the other side of the thickness direction for the center of the volume holographic element in the thickness direction. Accordingly, it is possible to suppress the bending of the volume holographic element. Therefore, it is possible to appropriately form stripes having different refractive indexes (diffraction grids) in the volume holographic element.

According to some embodiments, the volume holographic element may further including a first translucent film that is arranged between the first translucent substrate and the first holographic material layer, a second translucent film that is arranged between the second translucent substrate and the first holographic material layer, a first translucent adhesion layer that is arranged between the first translucent substrate and the first translucent film, and a second translucent adhesion layer that is arranged between the second translucent substrate and the second translucent film. In this case, it is possible to laminate the holographic material layer, the adhesive layer, and the film between the first translucent substrate and the second translucent substrate in order that is symmetric in the thickness direction. Therefore, in the volume holographic element manufacturing process, even though expansion or contraction is generated in the holographic material layer, and stress is added to the volume holographic element when the holographic material layer is exposed or when the holographic material layer is cured, the stress is cancelled out on one side and the other side of the thickness direction for the center of the volume holographic element in the thickness direction. Accordingly, it is possible to suppress the bending of the volume holographic element. Therefore, it is possible to appropriately form stripes having different refractive indexes (diffraction grids) in the volume holographic element.

According to some embodiments, the volume holographic element may further including a second holographic material layer that is arranged between the first holographic material layer and the second translucent film. In this case, it is possible to laminate the holographic material layer and the film between the first translucent substrate and the second translucent substrate in order that is symmetric in the thickness direction. Therefore, in the volume holographic element manufacturing process, even though expansion or contraction is generated in the holographic material layer, and stress is added to the volume holographic element when the holographic material layer is exposed or when the holographic material layer is cured, the stress is cancelled out on one side and the other side of the thickness direction for the center of the volume holographic element in the thickness direction. Accordingly, it is possible to suppress the bending of the volume holographic element. Therefore, it is possible to appropriately form stripes having different refractive indexes (diffraction grids) in the volume holographic element.

According to some embodiments, there is provided a volume holographic element manufacturing method including forming a laminated body in which a first translucent substrate, a first holographic material layer, and a second translucent substrate are sequentially arranged, and irradiating the first holographic material layer with at least one of object light and reference light from a side of the second translucent substrate, and the irradiating is performed in a state in which a first translucent anti-reflective layer is arranged on the first surface of the first translucent substrate, the first surface is a surface opposite to the holographic material layer.

According to some embodiments, in the volume holographic element manufacturing process, the first translucent anti-reflective layer is laminated on the first surface of the first translucent substrate. Therefore, when the first holographic material layer is irradiated with the exposure light, which includes object light or reference light, from the side opposite to the first translucent substrate in the oblique direction, it is difficult that the exposure light is obliquely reflected in the first surface of the first translucent substrate. Accordingly, when exposure is performed, it is possible to suppress the generation of interference fringes in locations other than the predetermined location of the first holographic material layer. Therefore, since it is possible to appropriately form stripes having different refractive indexes (diffraction grids), it is possible to suppress the deterioration of diffraction characteristics due to unnecessary stripes (diffraction grids).

In this case, it is preferable that, when the irradiating is performed, a second translucent anti-reflective layer is arranged on a second surface of the second translucent substrate, the second surface is a surface opposite to the first holographic material layer, and, in the irradiating, the first holographic material layer is irradiated with one of object light and reference light from a side of the second translucent substrate, and the first holographic material layer is irradiated with the other light from a side of the first translucent substrate. In this case, it is difficult that the exposure light, which is irradiated for the first holographic material layer from the side of the first translucent substrate, is reflected in the second surface of the second translucent substrate, and thus it is possible to suppress the generation of interference fringes in locations other than the predetermined location of the first holographic material layer.

According to some embodiments, there is provided a volume holographic element manufacturing method including arranging a holographic material layer on one surface of a translucent substrate, and irradiating at least one of object light and reference light from a side of the other surface which is a surface opposite to the one surface, and the irradiating is performed in a state in which the translucent anti-reflective layer is arranged on the other surface of the substrate.

According to the aspect, the translucent anti-reflective layer is laminated on another surface (outside surface) of the substrate. Therefore, when the holographic material layer is irradiated with the exposure light, which includes object light or reference light, from the side opposite to the substrate, it is difficult that the exposure light is obliquely reflected in the interface between the surface and the air layer. Accordingly, it is possible to suppress the generation of interference fringes in locations other than the predetermined location of the holographic material layer. Accordingly, since it is possible to appropriately form stripes having different refractive indexes (diffraction grids), it is possible to suppress the deterioration of diffraction characteristics due to unnecessary stripes (diffraction grids).

According to some embodiments, there is provided a display device including an image light generation device, and a light guiding system that guides image light which is emitted from the image light generation device, the light guiding system includes a volume holographic element, and the volume holographic element includes a first translucent substrate, a second translucent substrate that faces the first translucent substrate, a holographic material layer that is arranged between the first translucent substrate and the second translucent substrate, and a first translucent anti-reflective layer that is arranged on a first surface of the first translucent substrate, the first surface is a surface opposite to the holographic material layer.

In the display device according to some embodiments, the first translucent anti-reflective layer is laminated on the first outside surface of the first translucent substrate. Therefore, in the volume holographic element manufacturing process, when the holographic material layer is irradiated with the exposure light, which includes object light or reference light, from the side opposite to the first translucent substrate in the oblique direction, it is difficult that the exposure light is obliquely reflected in the first surface of the first translucent substrate. Accordingly, when exposure is performed, it is possible to suppress the generation of interference fringes in locations other than the predetermined location of the holographic material layer. Accordingly, since it is possible to appropriately form stripes having different refractive indexes (diffraction grids), it is possible to suppress the deterioration of diffraction characteristics due to unnecessary stripes (diffraction grids).

According to some embodiments, it is preferable that the display device further includes a second translucent anti-reflective layer that is arranged on a second surface of the second translucent substrate, the second surface is a surface opposite to the holographic material layer. In this case, it is difficult that the exposure light, which is irradiated for the holographic material layer from the side of the first translucent substrate, is reflected in the interface between the second translucent substrate and the air layer in the volume holographic element manufacturing process, and thus it is possible to suppress the generation of interference fringes in locations other than the predetermined location of the holographic material layer. Accordingly, since it is possible to appropriately form stripes having different refractive indexes (diffraction grids), it is possible to suppress the deterioration of diffraction characteristics due to unnecessary stripes (diffraction grids).

According to some embodiments, the light guiding system may include an optical projection system that projects image light which is emitted from the image light generation device; and a deflection member that deflects the image light, which is projected from the optical projection system, toward eyes of an observer, and the deflection member includes the volume holographic element.

BRIEF DESCRIPTION OF THE DRAWINGS

Embodiments will be described with reference to the accompanying drawings, wherein like numbers reference like elements.

FIGS. 7A to 7C are explanatory diagrams illustrating a volume holographic element according to a third embodiment.

DESCRIPTION OF EXEMPLARY EMBODIMENTS

Figure 11:
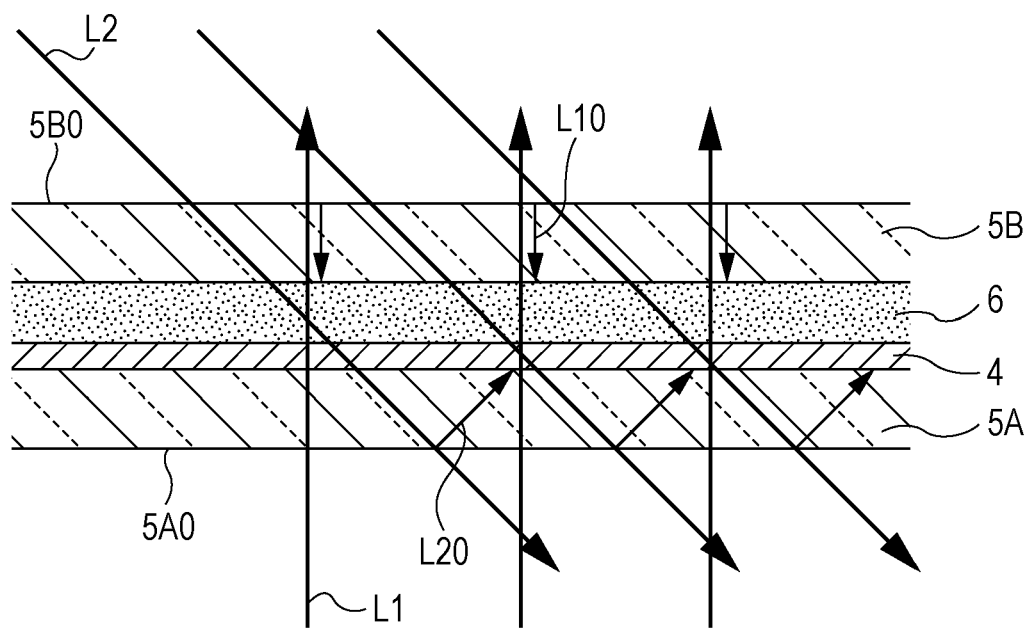
FIG. 11 is an explanatory diagram illustrating a volume holographic element according to a reference example of the some embodiments.

Hereinafter, embodiments will be described. Meanwhile, in the description below, the same reference symbols are attached to common parts for easy understanding of correspondence with a configuration which is described with reference to FIG. 11.

First Embodiment

Configuration of Volume Holographic Element 1

Figure 1A:
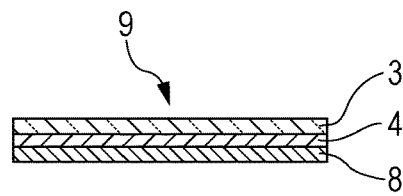
FIGS. 1A to 1E are explanatory diagrams illustrating a volume holographic element according to a first embodiment.
Figure 1B:
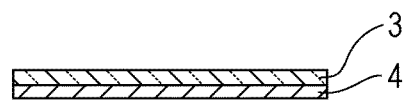
Figure 1C:
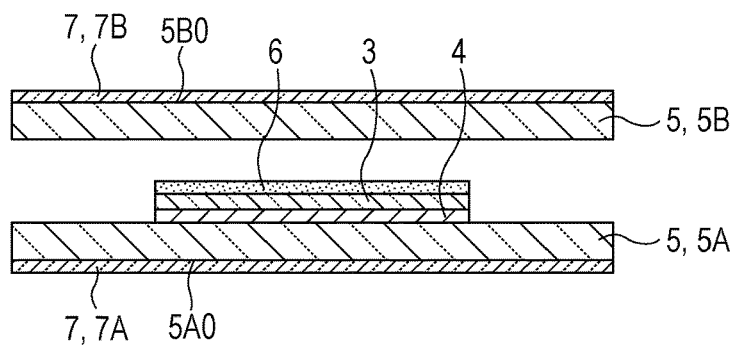
Figure 1D:
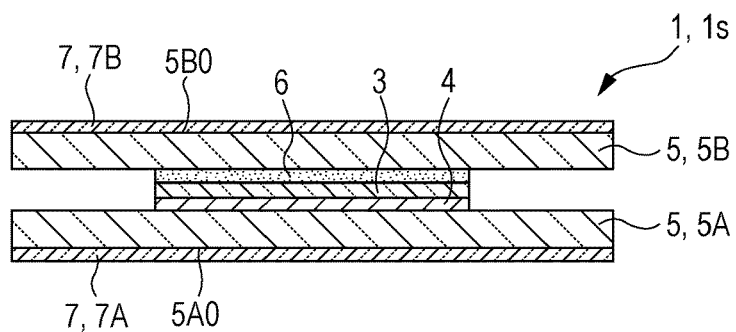
Figure 1E:
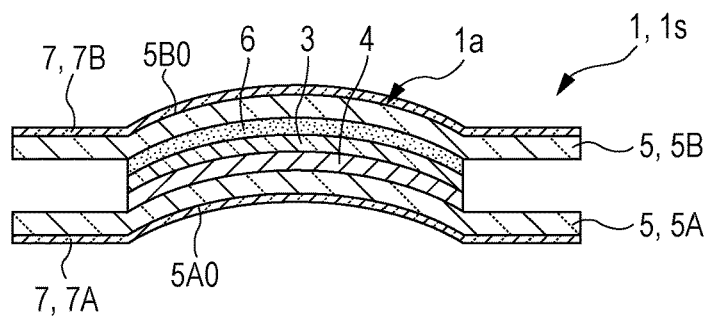

FIGS. 1A to 1E are explanatory diagrams illustrating a volume holographic element 1 according to a first embodiment. FIGS. 1A to 1C are explanatory diagrams illustrating a method of laminating respective layers in the volume holographic element 1, FIG. 1D is an explanatory diagram illustrating the lamination structure of the volume holographic element 1, and FIG. 1E is an explanatory diagram illustrating the volume holographic element 1 according to a modification example.

As illustrated in FIG. 1D, in the volume holographic element 1 according to the embodiment, a holographic material layer 4, in which a diffraction grid is formed, is laminated between a pair of translucent substrates 5 which are arranged to face each other. In addition, in the volume holographic element 1, the holographic material layer 4, a translucent film 3 which comes into contact with the holographic material layer 4, and a translucent adhesion layer 6, which adheres to the film 3 and one of the pair of substrate 5 (a first substrate and a second substrate), are laminated between the pair of substrates 5.

More specifically, in the volume holographic element 1 according to the embodiment, the holographic material layer 4, the film 3, and the adhesion layer 6 are sequentially laminated from the side of the first substrate 5A to the side of the second substrate 5B between a first substrate 5A and a second substrate 5B. In the embodiment, the film 3 is formed of a plastic film, such as polythylene telephthalate, polycarbonate, or triacetylcellulose. The substrate 5 includes a translucent plastic substrate including an acrylic resin, or a glass substrate. The adhesion layer 6 includes a thermo-setting adhesive, a moisture-curing adhesive, a dual liquid-mixing type adhesive, or an adhesive sheet.

Here, on the side of the first surface 5A0 of the first substrate 5A, which is a surface opposite to the holographic material layer 4, a translucent anti-reflective layer 7 (first anti-reflective layer 7A) is laminated. In addition, a translucent anti-reflective layer 7 (second anti-reflective layer 7B) is laminated on the side of a second surface 5B0 of the second substrate 5B, which is a surface opposite to the holographic material layer 4. In the embodiment, the first anti-reflective layer 7A is directly laminated on the first surface 5A0 of the first substrate 5A, and the second anti-reflective layer 7B is directly formed on the second surface 5B0 of the second substrate 5B. The first anti-reflective layer 7A and the second anti-reflective layer 7B are respectively formed of a translucent single film, such as magnesium fluoride, or a dielectric multilayer film in which a plurality of films having different refractive indexes are laminated. The first anti-reflective layer 7A and the second anti-reflective layer 7B have different thicknesses. In the embodiment, the thickness of the first anti-reflective layer 7A is thinner than the thickness of the second anti-reflective layer 7B according to the incident angle of the exposure light which will be described later.

Method of Manufacturing Volume Holographic Element 1

Figure 2:
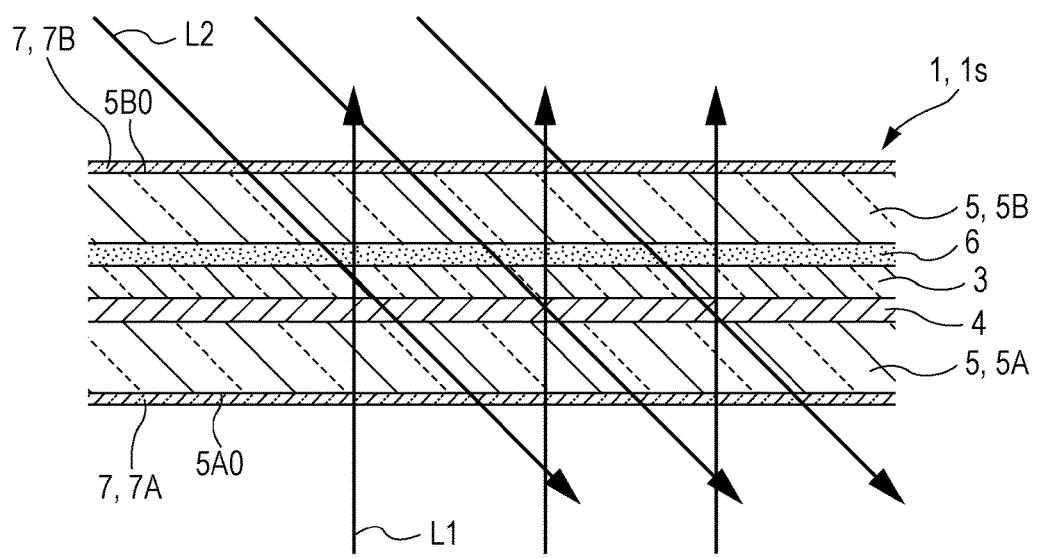
FIG. 2 is an explanatory diagram schematically illustrating an interference exposure process using plane waves in a volume holographic element manufacturing process according to the first embodiment.

FIG. 2 is an explanatory diagram schematically illustrating an interference exposure process using plane waves in a process of manufacturing the volume holographic element 1 according to the first embodiment.

In the process of manufacturing the volume holographic element 1 according to the embodiment, a material sheet 9, which is formed in such a way that the holographic material layer 4 in an uncured state or in a semi-cured state and a protection sheet 8 are laminated on one surface of the translucent film 3, is used, as illustrated in FIG. 1A. Here, when the volume holographic element 1 is formed as a light transmitting volume holographic element 1, the holographic material layer 4 includes a photosensitive polymer or a photoresist, and the holographic material layer 4, which is acquired before curing, has adhesiveness. In addition, when the volume holographic element 1 is formed as a reflection type holographic element or a partial reflection type holographic element, the holographic material layer 4 includes a silver salt emulsion, a photosensitive polymer, a photoresist or the like, and the holographic material layer 4, which is acquired before curing, has adhesiveness.

In the embodiment, first, in a lamination process, the protection sheet 8 is separated from the material sheet 9 in a darkroom, as shown in FIG. 1B. Subsequently, the film 3 is stuck to one surface of the first substrate 5A through the holographic material layer 4, as illustrated in FIG. 1C. Subsequently, the adhesion layer 6, which includes an adhesive, an adhesive sheet or the like, is provided on the surface of the film 3, which is opposite to the side of the holographic material layer 4. Subsequently, the second substrate 5B is adhered to the film 3 by the adhesion layer 6, as illustrated in FIG. 1D. As a result, a laminated body 1s, which is illustrated in FIG. 1D, is formed. Further, in the laminated body 1s, the holographic material layer 4, the film 3, and the adhesion layer 6 are sequentially laminated between the first substrate 5A and the second substrate 5B from the side of the first substrate 5A toward the side of the second substrate 5B. In the lamination process, the respective layers are pressed by a roller or the like, and are laminated in a pressed state.

Subsequently, in an interference exposure process, interference exposure is performed in such a way that the holographic material layer 4 is irradiated with object light L1 and reference light L2, which are acquired by dividing light flux emitted from a common light source, and parts which have different refractive indexes are formed in stripe shapes in the first holographic material layer 4, as illustrated in FIG. 2. The refractive index changes, for example, in a sine curve shape. In the embodiment, the holographic material layer 4 are irradiated with the reference light L2 from the side of the second substrate 5B in the oblique direction, and the holographic material layer 4 is vertically irradiated with the object light L1 from the side of the first substrate 5A. Here, both the object light L1 and the reference light L2 are formed of plane waves.

Subsequently, in a curing process, ultraviolet ray irradiation, heating, or the like is performed on the holographic material layer 4, and the holographic material layer 4 is cured. As a result, the volume holographic element 1 is manufactured.

In such a manufacturing method, in the embodiment, the interference exposure process illustrated in FIG. 2A is performed in a state in which the translucent anti-reflective layer 7 (first anti-reflective layer 7A) is laminated on the first surface 5A0 of the first substrate 5A and the translucent anti-reflective layer 7 (second anti-reflective layer 7B) is laminated on the second surface 5B0 of the second substrate 5B. A process of forming the first anti-reflective layer 7A and the second anti-reflective layer 7B is performed, for example, after the laminated body 1s is formed in the lamination process and before the interference exposure process is performed. In addition, the first anti-reflective layer 7A and the second anti-reflective layer 7B may be formed on the first substrate 5A and the second substrate 5B before the lamination process is performed, and then the lamination process may be performed. In addition, one of the first anti-reflective layer 7A and the second anti-reflective layer 7B may be formed before the lamination process is performed, and the other first anti-reflective layer 7A and the second anti-reflective layer 7B may be formed after the lamination process is performed. In the embodiment, as illustrated in FIG. 1C, the first anti-reflective layer 7A and the second anti-reflective layer 7B are formed on the first substrate 5A and the second substrate 5B before the lamination process is performed. Thereafter, the lamination process is performed.

Main Effect of Embodiment

As described above, the embodiment includes the lamination process of laminating the holographic material layer 4 on the one surface side of the translucent substrate 5, and the interference exposure process of obliquely irradiating the holographic material layer 4 with at least one of the object light L1 and the reference light L2 from the side opposite to the substrate 5. The interference exposure process is performed in a state in which the translucent anti-reflective layer 7 is laminated on the other surface side of the substrate 5 (the external surface of the substrate 5 on the side opposite to the holographic material layer 4).

For example, in the embodiment, when the interference exposure is performed using plane waves as illustrated in FIG. 2, the holographic material layer 4 is irradiated with the reference light L2 from the side of the second substrate 5B in the oblique direction, and the holographic material layer 4 is vertically irradiated with the object light L1 from the side of the first substrate 5A. In this case, the anti-reflective layer 7 (first anti-reflective layer 7A) is formed on the first surface 5A0 of the first substrate 5A. Therefore, it is difficult that a case in which the reference light L2 is reflected in the first surface 5A0 of the first substrate 5A in the oblique direction occurs. In addition, the anti-reflective layer 7 (second anti-reflective layer 7B) is formed on the second surface 5B0 of the second substrate 5B. Therefore, it is difficult that a case in which the object light L1 is reflected in the second surface 5B0 of the second substrate 5B in the direction which is deviated from the vertical direction. Accordingly, when exposure is performed, it is possible to suppress the generation of interference fringes in locations other than a predetermined location of the holographic material layer 4. Therefore, since it is possible to appropriately form stripes (diffraction grids) having different refractive indexes in the volume holographic element 1, it is possible to suppress the deterioration of diffraction characteristics due to unnecessary stripes (diffraction grids).

In addition, in the embodiment, the thickness of the first anti-reflective layer 7A becomes thinner than the thickness of the second anti-reflective layer 7B in accordance with the incident angle of the exposure light, and the thickness of the first anti-reflective layer 7A becomes thinner than the thickness of the second anti-reflective layer 7B. Therefore, it is possible to form the first anti-reflective layer 7A which is appropriate for the obliquely irradiated reference light L2, and it is possible to form the second anti-reflective layer 7B which is appropriate for the vertically irradiated object light L1.

First Modification Example of First Embodiment

Although the volume holographic element 1 (laminated body 1s), which is illustrated in FIG. 1D, has a flat plate shape, the volume holographic element 1 may include a bending section 1a in which the first substrate 5A, the holographic material layer 4, the film 3, the adhesion layer 6 and the second substrate 5B are bent on one side of the thickness direction, as illustrated in FIG. 1E. It is possible to configure the bending section 1a using the bent substrate 5 when, for example, the respective layers are laminated. The configuration includes a configuration in which, when the interference exposure is performed in a state in which the bending section 1a is included, the reference light L2 includes rays which are obliquely incident into the laminated body 1s and the object light L1 is obliquely incident into the laminated body 1s. In such a case, since the anti-reflective layer 7 (first anti-reflective layer 7A) is formed on the first surface 5A0 of the first substrate 5A, it is difficult that the reference light L2 is obliquely reflected in the first surface 5A0 of the first substrate 5A. In addition, since the anti-reflective layer 7 (second anti-reflective layer 7B) is formed on the second surface 5B0 of the second substrate 5B, it is difficult that the object light L1 is obliquely reflected in the second surface 5B0 of the second substrate 5B. Accordingly, in the volume holographic 1, it is possible to suppress the generation of interference fringes in locations other than the predetermined location of the holographic material layer 4, and thus it is possible to suppress the deterioration of diffraction characteristics due to unnecessary interference fringes (unnecessary diffraction grid).

In addition, in the embodiment, in the bending section 1a, the incident angle of the reference light L2 for the laminated body 1s differs according to a location and the incident angle of the object light L1 for the laminated body 1s differs according to the location. Accordingly, the thickness of the first anti-reflective layer 7A may be changed and adjusted for each location of the first surface 5A0 of the first substrate 5A according to the incident angle of the reference light L2 for the laminated body 1s, and the thickness of the second anti-reflective layer 7B may be changed and adjusted for each location of the second surface 5B0 of the second substrate 5B according to the incident angle of the object light L1 for the laminated body 1s.

In addition, although the thickness of the first anti-reflective layer 7A and the thickness of the second anti-reflective layer 7B may be changed according to the incident angle, the thickness of the first anti-reflective layer 7A and the thickness of the second anti-reflective layer 7B may be set to average thickness such that it is possible to lessen the influence of the change in the incident angle of the object light L1.

Second Modification Example of First Embodiment

Figure 3:
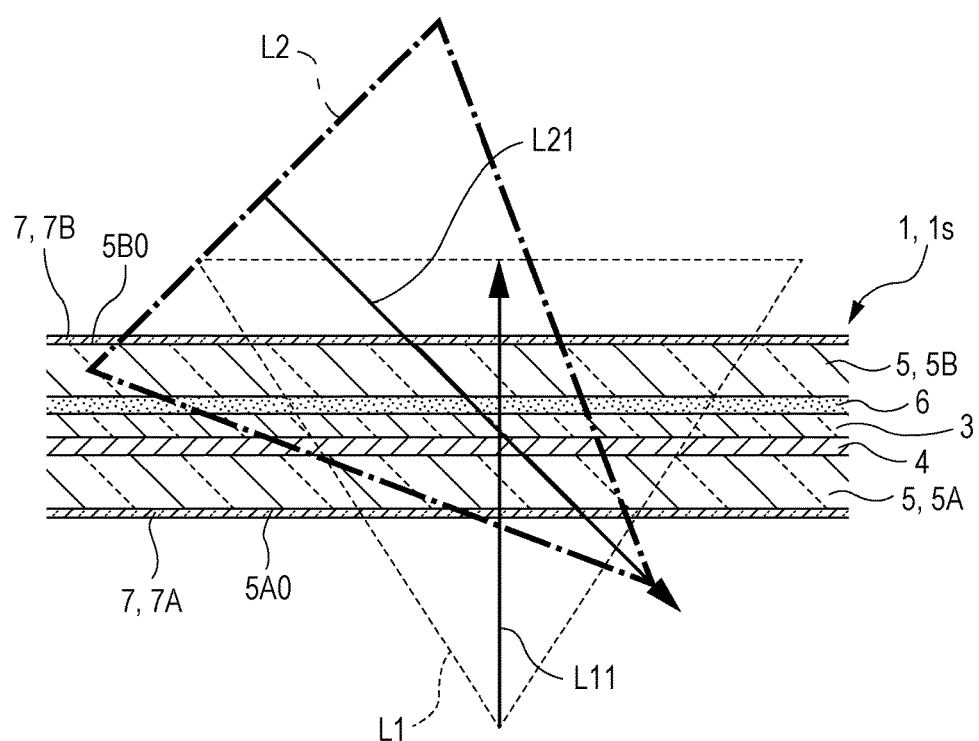
FIG. 3 is an explanatory diagram schematically illustrating an interference exposure process using spherical waves in the volume holographic element manufacturing process according to a second modification example of the first embodiment.

FIG. 3 is an explanatory diagram schematically illustrating the interference exposure process using spherical waves in a process of manufacturing the volume holographic element 1 according to a second modification example of the first embodiment. Meanwhile, since the embodiment and embodiments, which will be described later, basically have common configurations, the same reference symbols are attached to common parts and the description thereof will not be repeated.

In the second embodiment, the interference exposure process is performed using the plane wave. However, in the embodiment, interference exposure process is performed using spherical waves, as illustrated in FIG. 3. For example, the central optical axis L21 of the reference light L2 which includes spherical waves is set to be oblique for the second substrate 5B, and the holographic material layer 4 is irradiated with the reference light L2, and the central optical axis L11 of the object light L1 which includes spherical waves is set to be perpendicular to the first substrate 5A, and the holographic material layer 4 is irradiated with the object light L1.

The configuration includes a configuration in which the reference light L2 includes rays which are obliquely incident into the laminated body 1s, and the object light L1 is obliquely incident into the laminated body 1s. In such a case, since the anti-reflective layer 7 (first anti-reflective layer 7A) is formed on the first surface 5A0 of the first substrate 5A, it is difficult for the reference light L2 to obliquely reflected in the first surface 5A0 of the first substrate 5A. In addition, since the anti-reflective layer 7 (second anti-reflective layer 7B) is formed on the second surface 5B0 of the second substrate 5B, it is difficult for the object light L1 to obliquely reflected in the second surface 5B0 of the second substrate 5B. Accordingly, when exposure is performed, it is possible to suppress the generation of interference fringes in locations other than the predetermined location of the holographic material layer 4, and thus, in the volume holographic element 1, it is possible to suppress the deterioration in the diffraction characteristics due to unnecessary diffraction grids.

Here, in accordance with the incident angle of the exposure light, the thickness of the first anti-reflective layer 7A becomes thinner than the thickness of the second anti-reflective layer 7B, and the thickness of the first anti-reflective layer 7A becomes thinner than the thickness of the second anti-reflective layer 7B. Therefore, it is possible to form the first anti-reflective layer 7A which is appropriate for the obliquely irradiated reference light L2, and it is possible to form the second anti-reflective layer 7B which is appropriate for the vertically irradiated object light L1.

In addition, in the embodiment, the interference exposure is performed using spherical waves, and thus the incident angle of the reference light L2 for the laminated body 1s differs according to a location, and the incident angle of the object light L1 for the laminated body 1s differs according to the location. Accordingly, the thickness of the first anti-reflective layer 7A may be changed and adjusted for each location of the first surface 5A0 of the first substrate 5A according to the incident angle of the reference light L2 for the laminated body 1s, and the thickness of the second anti-reflective layer 7B may be changed and adjusted for each location of the second surface 5B0 of the second substrate 5B according to the incident angle of the object light L1 for the laminated body 1s.

In addition, although the thickness of the first anti-reflective layer 7A and the thickness of the second anti-reflective layer 7B may be changed according to the incident angles, the thickness of the first anti-reflective layer 7A and the thickness of the second anti-reflective layer 7B may be set to an average thickness such that it is possible to lessen the influence of the change in the incident angle of the object light L1.

Third Modification Example of First Embodiment

Figure 4:
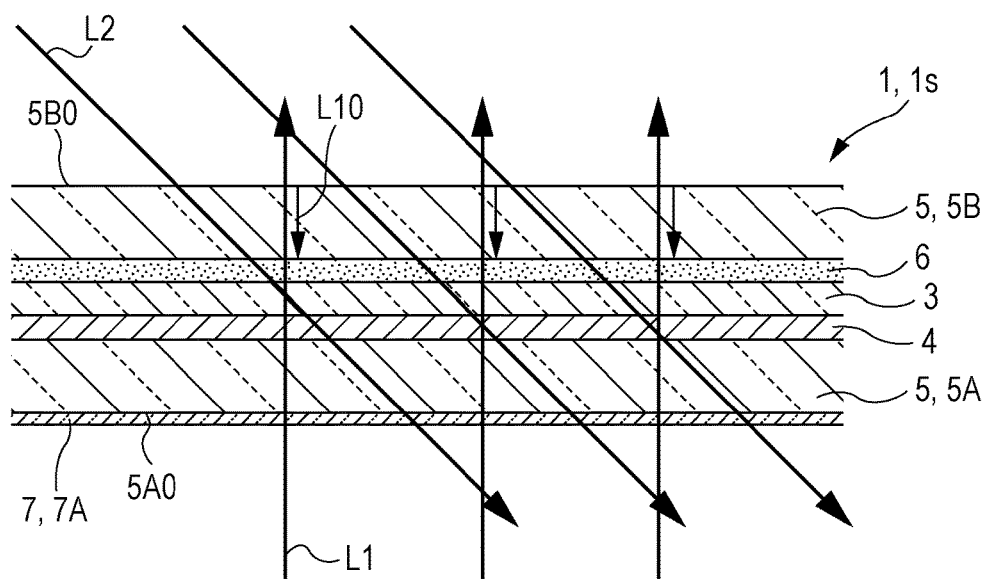
FIG. 4 is an explanatory diagram schematically illustrating an interference exposure process using plane waves in the volume holographic element manufacturing process according to a third modification example of the first embodiment.

FIG. 4 is an explanatory diagram schematically illustrating the interference exposure process using plane waves in a process of manufacturing the volume holographic element 1 according to a third modification example of the first embodiment.

In the first embodiment, even when the laminated body 1s (volume holographic element 1) has the flat plate shape, the first anti-reflective layer 7A is formed on the first surface 5A0 of the first substrate 5A, and the second anti-reflective layer 7B is formed on the second surface 5B0 of the second substrate 5B, as illustrated in FIG. 1D. In contrast, in the embodiment, in the flat plate-shaped laminated body 1s (volume holographic element 1), the anti-reflective layer 7 (first anti-reflective layer 7A) is formed on the first surface 5A0 of the first substrate 5A, as illustrated in FIG. 4. However, the anti-reflective layer 7 (second anti-reflective layer 7B) is not formed on the second surface 5B0 of the second substrate 5B.

In a case of the configuration, when the holographic material layer 4 is irradiated with the reference light L2 which includes the plane waves from the side of the second substrate 5B in the oblique direction, it is difficult that a situation, in which the reference light L2 is reflected in the first surface 5A0 of the first substrate 5A in the oblique direction, occurs. In contrast, when the holographic material layer 4 is vertically irradiated with the object light L1, which is formed of plane waves, from the side of the first substrate 5A, some of the object light L1 is reflected in the second surface 5B0 of the second substrate 5B. However, the reflected light is vertically reflected as shown using arrow L10. Accordingly, the difference in the irradiation location of the object light L1 is small, and thus it is possible to suppress the generation of interference fringes in locations other than the predetermined location of the holographic material layer 4. Therefore, in the volume holographic element 1, it is possible to suppress the deterioration of diffraction characteristics due to unnecessary interference fringes (unnecessary diffraction grid).

Fourth Modification Example of First Embodiment

In the first embodiment, the holographic material layer 4, the film 3, and the adhesion layer 6 are sequentially laminated from the side of the first substrate 5A toward the side of the second substrate 5B between the first substrate 5A and the second substrate 5B. However, the embodiment may be applied to a case in which the adhesion layer 6, the film 3, and the holographic material layer 4 are sequentially laminated from the side of the first substrate 5A toward the side of the second substrate 5B. In this case, the adhesion layer 6 adheres to the first substrate 5A and the film 3.

Second Embodiment

Figure 5A:
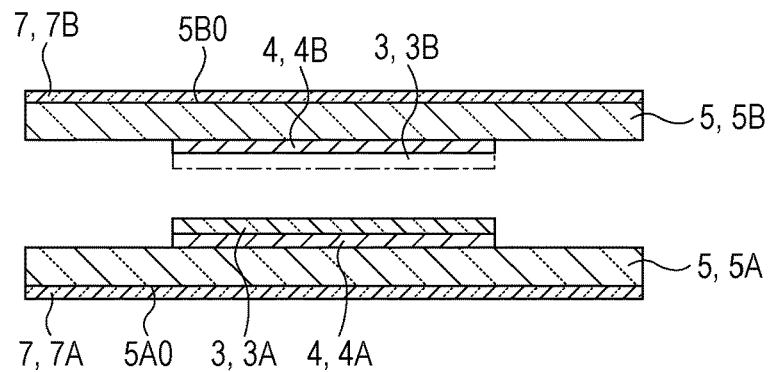
FIGS. 5A to 5C are explanatory diagrams illustrating a volume holographic element according to a second embodiment.
Figure 5B:
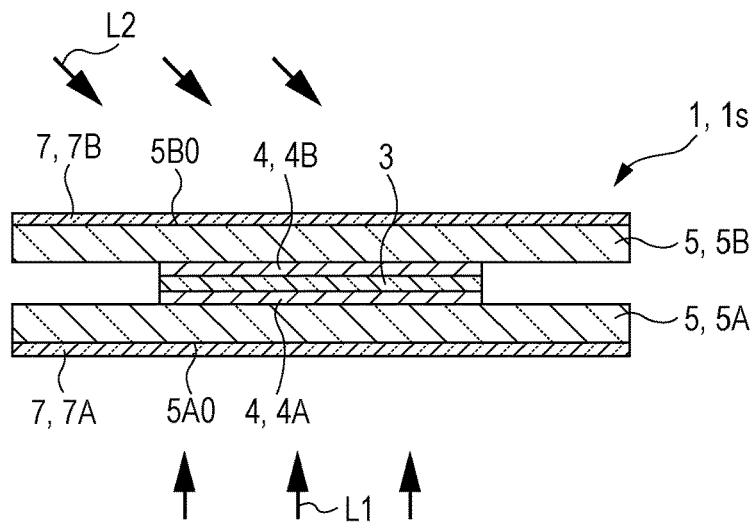
Figure 5C:
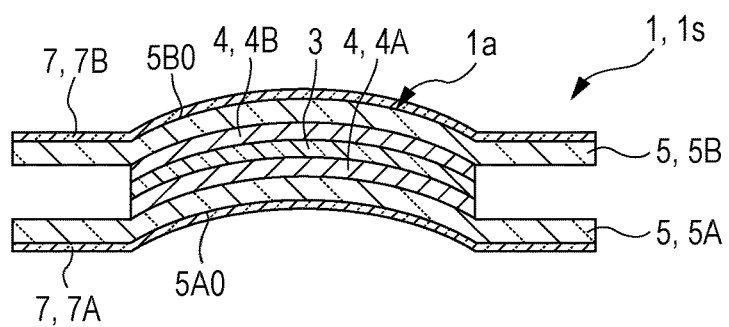
Figure 6A:
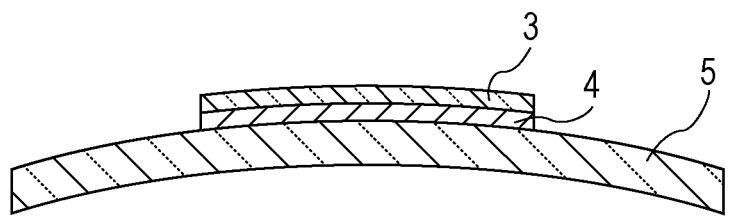
FIGS. 6A to 6C are explanatory diagrams illustrating a problem which is solved by the volume holographic element according to the second embodiment.
Figure 6B:
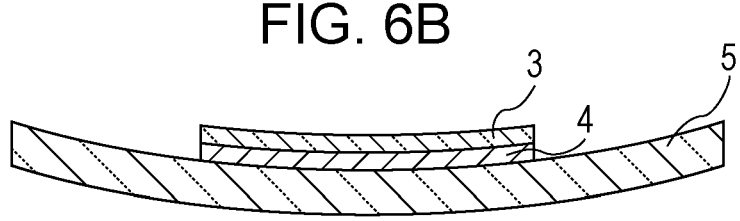
Figure 6C:
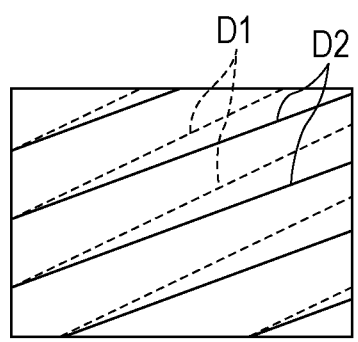

FIGS. 5A to 5C are explanatory diagrams illustrating a volume holographic element 1 according to the second embodiment, FIG. 5A is an explanatory diagram illustrating a method of laminating respective layers in the volume holographic element 1, FIG. 5B is an explanatory diagram illustrating the lamination structure of the volume holographic element 1, and FIG. 5C is an explanatory diagram illustrating a volume holographic element 1 according to a modification example. FIGS. 6A to 6C are explanatory diagrams illustrating a problem which is solved by the volume holographic element according to the second embodiment. FIG. 6A is an explanatory diagram illustrating a case in which the holographic material layer 4 is expanded, FIG. 6B is an explanatory diagram illustrating a case in which the holographic material layer 4 is contracted, and FIG. 6C is an explanatory diagram illustrating unnecessary interference fringes.

As illustrated in FIG. 5B, in the volume holographic element 1 according to the embodiment, a holographic material layer 4 on which a diffraction grid is formed, a translucent film 3 which comes into contact with the holographic material layer 4, and a translucent substrate 5 are laminated in order that is symmetric in the thickness direction. More specifically, the volume holographic element 1 according to the embodiment includes a first holographic material layer 4A and a second holographic material layer 4B as the holographic material layer 4, and a first substrate 5A and a second substrate 5B as the substrate 5. Therefore, in the volume holographic element 1, the first holographic material layer 4A, the film 3, and the second holographic material layer 4B are sequentially laminated between the first substrate 5A and the second substrate 5B from the side of the first substrate 5A toward the side of the second substrate 5B. In the embodiment, the diffraction grids are formed on the first holographic material layer 4A and the second holographic material layer 4B. Here, a translucent anti-reflective layer 7 (first anti-reflective layer 7A) is laminated on the side of the first surface 5A0, which includes a surface on the side opposite to the holographic material layer 4, of the first substrate 5A. In addition, the translucent anti-reflective layer 7 (second anti-reflective layer 7B) is laminated on the side of a second surface 5B0 of the second substrate 5B, which is a surface opposite to the holographic material layer 4.

In the process of manufacturing the volume holographic element 1 according to the embodiment, the protection sheet 8 is separated from the material sheet 9, in which the holographic material layer 4 in the uncured state or the semi-cured state and the protection sheet 8 are laminated on one surface of the translucent film 3, in the dark room, as illustrated in FIGS. 1A and 1B. Here, the holographic material layer 4, which is acquired before curing, has adhesiveness.

Accordingly, in the lamination process, the film 3 (first film 3A) is stuck to one surface of the first substrate 5A through the holographic material layer 4 (first holographic material layer 4A), as illustrated in FIG. 5A. In contrast, another film 3 (second film 3B) is stuck to one surface of the second substrate 5B through another holographic material layer 4 (second holographic material layer 4B). Subsequently, the second film 3B is separated from the second holographic material layer 4B. Subsequently, the second substrate 5B is stuck to the surface of the first film 3A on a side opposite to the side, on which the first holographic material layer 4A is laminated, through the second holographic material layer 4B.

Subsequently, in the interference exposure process, the interference exposure is performed in such a way that the first holographic material layer 4A and the second holographic material layer 4B of the laminated body 1s are irradiated with the object light L1 and the reference light L2, which are acquired by dividing the light flux emitted from the common light source, and the interference fringes are formed in the first holographic material layer 4A and the second holographic material layer 4B, as illustrated in FIG. 5B.

Subsequently, in the curing process, ultraviolet ray irradiation, heating, or the like is performed on the holographic material layer 4 (the first holographic material layer 4A and the second holographic material layer 4B), and the holographic material layer 4 (the first holographic material layer 4A and the second holographic material layer 4B) is cured. As a result, the volume holographic element 1 is manufactured.

In the volume holographic element 1, which is configured as described above, similarly to the first embodiment, it is difficult that a situation, in which the reference light L2 is reflected in the first surface 5A0 of the first substrate 5A in the oblique direction, occurs. In addition, it is difficult that a situation, in which the object light L1 is reflected in the second surface 5B0 of the second substrate 5B in the direction which is deviated from the vertical direction, occurs. Accordingly, since it is possible to suppress the generation of interference fringes in locations other than the predetermined location of the holographic material layer 4, there is an effect which is similar to the first embodiment, that is, it is possible to suppress the deterioration in diffraction characteristics due to unnecessary interference fringes (unnecessary diffraction grids).

In addition, in the embodiment, the holographic material layer 4, the film 3, and the substrate 5 are laminated in order that is symmetric on one side and the other side of the thickness direction for the center (film 3) of the volume holographic element 1 in the thickness direction. Therefore, even though expansion or contraction is generated in the holographic material layer 4 and stress is added to the volume holographic element 1 when the holographic material layer 4 is exposed or when the holographic material layer 4 is cured, the stress is cancelled out on one side and the other side of the thickness direction for the center of the volume holographic element 1 in the thickness direction. Accordingly, it is possible to suppress the bending of the volume holographic element 1. Therefore, it is possible to appropriately form the diffraction grids of the volume holographic element 1.

For example, as illustrated in FIGS. 6A and 6B, when the holographic material layer 4 and the film 3 are laminated on the substrate 5 and when the interference fringes are formed on the holographic material layer 4 or the holographic material layer 4 is cured, expansion or contraction is generated in the holographic material layer 4, and thus the substrate 5 is bent. At this time, when the holographic material layer 4 is expanded, the substrate 5 is transformed such that a side, on which the holographic material layer 4 is formed, becomes a convex surface, as illustrated in FIG. 6A. In contrast, when the holographic material layer 4 is contracted, the substrate 5 is transformed such that a side, on which the holographic material layer 4 is formed, becomes a concave surface, as illustrated in FIG. 6B. As a result, even when it is desired to form the interference fringes which are extended in the predetermined direction expressed by dotted lines D1 in FIG. 6C, inclined interference fringes, expressed by solid lines D2, are countlessly formed due to the transformation of the volume holographic element 1. Therefore, in the embodiment, even when stress is added to the volume holographic element 1, the stress is cancelled out on one side and the other side of the thickness direction for the center of the volume holographic element 1 in the thickness direction. Therefore, it is difficult that the bending illustrated in FIGS. 6A and 6B occurs. Therefore, it is possible to suppress unnecessary diffraction grids, illustrated in FIG. 6C, from being generated.

Meanwhile, in the embodiment, approximately similarly to the first modification example of the first embodiment, the embodiment may be applied to a case in which the bending section 1a, in which the first substrate 5A, the holographic material layer 4, the film 3, first holographic material layer 4, and the second substrate 5B are bent on one side of the thickness direction, is provided, as illustrated in FIG. 5C. In addition, in the embodiment, the configurations described in the second and third modification examples of the first embodiment may be used.

Third Embodiment

FIGS. 7A to 7C are explanatory diagrams illustrating a volume holographic element 1 according to a third embodiment. FIG. 7A is an explanatory diagram illustrating a method of laminating the respective layers in the volume holographic element 1, FIG. 7B is an explanatory diagram illustrating the lamination structure of the volume holographic element 1, and FIG. 7C is an explanatory diagram illustrating the volume holographic element 1 according to a modification example.

As illustrated in FIG. 7B, approximately similarly to the second embodiment, in the volume holographic element 1 according to the embodiment, the holographic material layer 4, on which diffraction grids are formed, a translucent film 3, which come into contact with the holographic material layer 4, a translucent adhesion layer 6 which causes the film 3 to adhere to each other, and a translucent substrate 5 are laminated in order that is symmetric in the thickness direction. More specifically, the volume holographic element 1 according to the embodiment includes a first holographic material layer 4A and a second holographic material layer 4B as the holographic material layer 4, includes a first film 3A and a second film 3B as the film 3, and includes a first substrate 5A and a second substrate 5B as the substrate 5. Therefore, in the volume holographic element 1, the first holographic material layer 4A, the first film 3A, the adhesion layer 6, the second film 3B, and the second holographic material layer 4B are sequentially laminated between the first substrate 5A and the second substrate 5B from the side of the first substrate 5A toward the second substrate 5B. In the embodiment, diffraction grids are formed in the first holographic material layer 4A and the second holographic material layer 4B. Here, a translucent anti-reflective layer 7 (first anti-reflective layer 7A) is laminated on the side of the first surface 5A0 of the first substrate 5A which is an opposite surface to the holographic material layer 4. In addition, a translucent anti-reflective layer 7 (second anti-reflective layer 7B) is laminated on the side of a second surface 5B0 of the second substrate 5B which is a surface opposite to the holographic material layer 4.

In the process of manufacturing the volume holographic element 1 according to the embodiment, the protection sheet 8 is separated from the material sheet 9, in which the holographic material layer 4 in the uncured state or the semi-cured state and the protection sheet 8 are laminated on one surface of the translucent film 3, in the dark room, as illustrated in FIGS. 1A and 1B. Here, the holographic material layer 4, which is acquired before curing, has adhesiveness.

Accordingly, in the lamination process, the film 3 (first film 3A) is stuck to one surface of the first substrate 5A through the holographic material layer 4 (first holographic material layer 4A), as illustrated in FIG. 7A. In contrast, another film 3 (second film 3B) is stuck to one surface of the second substrate 5B through another holographic material layer 4 (second holographic material layer 4B). Subsequently, after the adhesion layer 6, which includes an adhesive, an adhesive sheet or the like, is provided on the surface which is opposite to the side of the first holographic material layer 4A of the first film 3A, the first film 3A adheres to the second film 3B through the adhesion layer 6 as illustrated in FIG. 7B.

Subsequently, in the interference exposure process, the interference exposure is performed in such a way that the first holographic material layer 4A and the second holographic material layer 4B of the laminated body 1s are irradiated with the object light L1 and the reference light L2, which are acquired by dividing the light flux emitted from the common light source, and the interference fringes are formed in the first holographic material layer 4A and the second holographic material layer 4B, as illustrated in FIG. 7B.

Subsequently, in the curing process, ultraviolet ray irradiation, heating, or the like is performed on the holographic material layer 4 (the first holographic material layer 4A and the second holographic material layer 4B), holographic material layer 4 (first holographic material layer 4A and the second holographic material layer 4B) are cured. As a result, the volume holographic element 1 is manufactured.

In the volume holographic element 1, which has the above configuration, similarly to the first embodiment, it is difficult that a situation, in which the reference light L2 is reflected in the first surface 5A0 of the first substrate 5A in the oblique direction, occurs. In addition, it is difficult that a situation, in which the object light L1 is reflected in the second surface 5B0 of the second substrate 5B in the direction which is deviated from the vertical direction, occurs. Accordingly, since it is possible to suppress the generation of interference fringes in locations other than the predetermined location of the holographic material layer 4, there is an effect which is similar to the first embodiment, that is, it is possible to suppress the deterioration in diffraction characteristics due to unnecessary diffraction grids.

In addition, in the embodiment, the holographic material layer 4, the film 3, the adhesion layer 6, and the substrate 5 are laminated in order that is symmetric on one side and the other side of the thickness direction for the center (adhesion layer 6) of the volume holographic element 1 in the thickness direction. Therefore, similarly to the second embodiment, even though stress is added to the volume holographic element 1 due to the expansion or contraction of the holographic material layer 4 when the holographic material layer 4 is exposed or when the holographic material layer 4 is cured, the stress is cancelled out on one side and the other side of the thickness direction for the center of the volume holographic element 1 in the thickness direction. Accordingly, it is possible to suppress the bending of the volume holographic element 1, and thus it is possible to appropriately form the diffraction grids in the volume holographic element 1.

Meanwhile, in the embodiment, approximately similarly to the first modification example of the first embodiment, the embodiment may be applied to a case in which the bending section 1a, in which the first substrate 5A, the first holographic material layer 4A, the first film 3A, the adhesion layer 6, the second film 3B, the second holographic material layer 4B, and the second substrate 5B are bent on one side of the thickness direction, is provided, as illustrated in FIG. 7C. In addition, in the embodiment, the configurations described in the second and third modification examples of the first embodiment may be used.

Fourth Embodiment

Figure 8A:
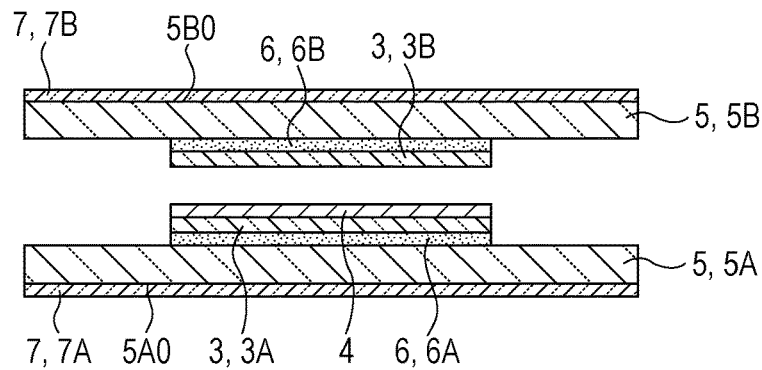
FIGS. 8A to 8C are explanatory diagrams illustrating a volume holographic element according to a fourth embodiment.
Figure 8B:
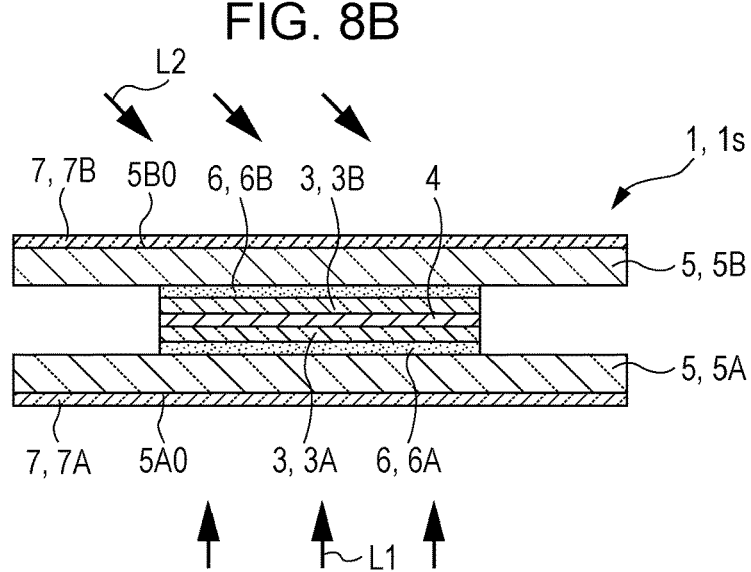
Figure 8C:
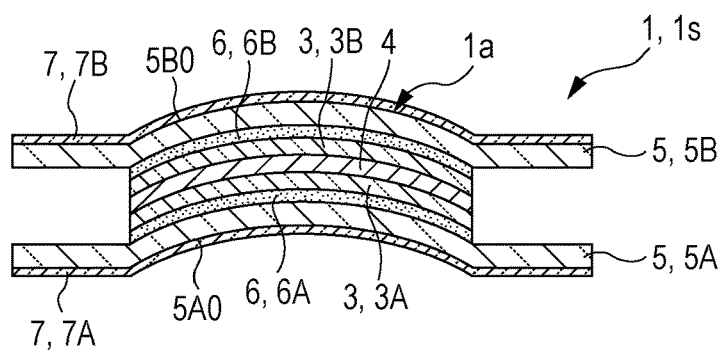

FIGS. 8A to 8C are explanatory diagrams illustrating a volume holographic element 1 according to a fourth embodiment. FIG. 8A is an explanatory diagram illustrating a method of laminating respective layers in the volume holographic element 1, FIG. 8B is an explanatory diagram illustrating the lamination structure of the volume holographic element 1, and FIG. 8C is an explanatory diagram illustrating the volume holographic element 1 according to a modification example.

Approximately similarly to the second embodiment, in the volume holographic element 1 according to the embodiment, a holographic material layer 4, on which diffraction grids are formed, translucent films 3, which come into contact with the holographic material layer 4, translucent substrates 5, and translucent adhesion layers 6 which cause the films 3 to adhere to the substrates 5 are laminated in order that is symmetric in the thickness direction, as illustrated in FIG. 8B. More specifically, the volume holographic element 1 according to the embodiment includes a first adhesion layer 6A and a second adhesion layer 6B as the adhesion layer 6, includes a first film 3A and a second film 3B as the film 3, and a first substrate 5A and a second substrate 5B. Therefore, in the volume holographic element 1, the first adhesion layer 6A, the first film 3A, the holographic material layer 4, the second film 3B, and the second adhesion layer 6B are sequentially laminated between the first substrate 5A and the second substrate 5B toward the side of the first substrate 5A and the second substrate 5B. Here, a translucent anti-reflective layer 7 (first anti-reflective layer 7A) is laminated on the side of the first surface 5A0 of the first substrate 5A, which is a surface opposite to the holographic material layer 4. In addition, a translucent anti-reflective layer 7 (second anti-reflective layer 7B) is laminated on the side of the second surface 5B0 of the second substrate 5B, which is a surface opposite to the holographic material layer 4.

In the process of manufacturing the volume holographic element 1 according to the embodiment, the protection sheet 8 is separated from the material sheet 9, in which the holographic material layer 4 in the uncured state or the semi-cured state and the protection sheet 8 are laminated on one surface of the translucent film 3, in the dark room, as illustrated in FIGS. 1A and 1B. Here, the holographic material layer 4, which is acquired before curing, has adhesiveness.

Accordingly, in the lamination process, the films 3 are stuck to each other through the holographic material layer 4, as illustrated in FIG. 8A. More specifically, the film 3 (first film 3A), which includes the holographic material layer 4 on one surface, has other surface which is stuck to one surface of the first substrate 5A by the adhesion layer 6 (first adhesion layer 6A). In contrast, another film 3 (second film 3B), which does not include the holographic material layer 4, adheres to one surface of the second substrate 5B by another adhesion layer 6 (second adhesion layer 6B). Subsequently, the first film 3A is stuck to the second film 3B through the holographic material layer 4.

Subsequently, in the interference exposure process, the interference exposure is performed in such a way that the holographic material layer 4 of the laminated body 1s are irradiated with the object light L1 and the reference light L2, which are acquired by dividing the light flux emitted from the common light source, and the interference fringes are formed in the holographic material layer 4, as illustrated in FIG. 8B.

Subsequently, in the exposure process, ultraviolet ray irradiation, heating, or the like is performed on the holographic material layer 4, and the holographic material layer 4 is cured. As a result, the volume holographic element 1 is manufactured.

In the volume holographic element 1, which has the above configuration, similarly to the first embodiment, it is difficult that a situation, in which the reference light L2 is reflected in the first surface 5A0 of the first substrate 5A in the oblique direction, occurs. In addition, it is difficult that a situation, in which the object light L1 is reflected in the second surface 5B0 of the second substrate 5B in the direction which is deviated from the vertical direction, occurs. Accordingly, since it is possible to suppress the generation of interference fringes in locations other than the predetermined location of the holographic material layer 4, there is an effect which is similar to the first embodiment, that is, it is possible to suppress the deterioration in diffraction characteristics due to unnecessary diffraction grids.

In addition, in the embodiment, the holographic material layer 4, the film 3, the substrate 5, and the adhesion layer 6 are laminated in order that is symmetric on one side and the other side of the thickness direction for the center (holographic material layer 4) of the volume holographic element 1 in the thickness direction. Therefore, similarly to the second embodiment, even though stress is added to the volume holographic element 1 due to the expansion or contraction of the holographic material layer 4 when the holographic material layer 4 is exposed or when the holographic material layer 4 is cured, the stress is cancelled out on one side and the other side of the thickness direction for the center of the volume holographic element 1 in the thickness direction. Accordingly, it is possible to suppress the bending of the volume holographic element 1, and thus it is possible to appropriately form the diffraction grids in the volume holographic element 1.

Meanwhile, approximately similarly to the first modification example of the first embodiment, in the embodiment, the embodiment may be applied to a case in which the bending section 1a, in which the first substrate 5A, the first adhesion layer 6A, the first film 3A, the holographic material layer 4, the second film 3B, the second adhesion layer 6B, and the second substrate 5B are bent on one side of the thickness direction, is provided, as illustrated in FIG. 8C. In addition, in the embodiment, the configurations described in the second and third modification examples of the first embodiment may be used.

Fifth Embodiment

Figure 9A:
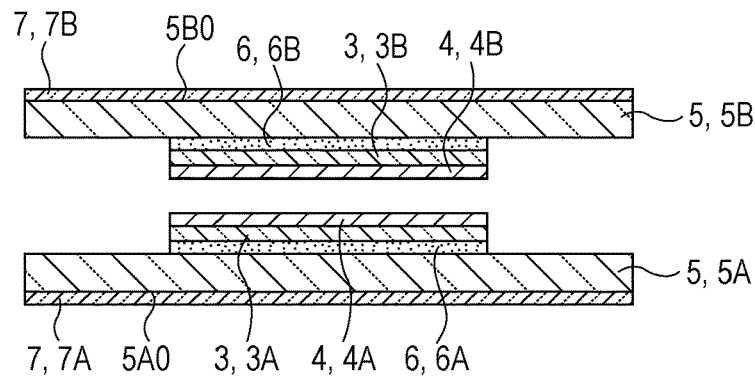
FIGS. 9A to 9C are explanatory diagrams illustrating a volume holographic element according to a fifth embodiment.
Figure 9B:
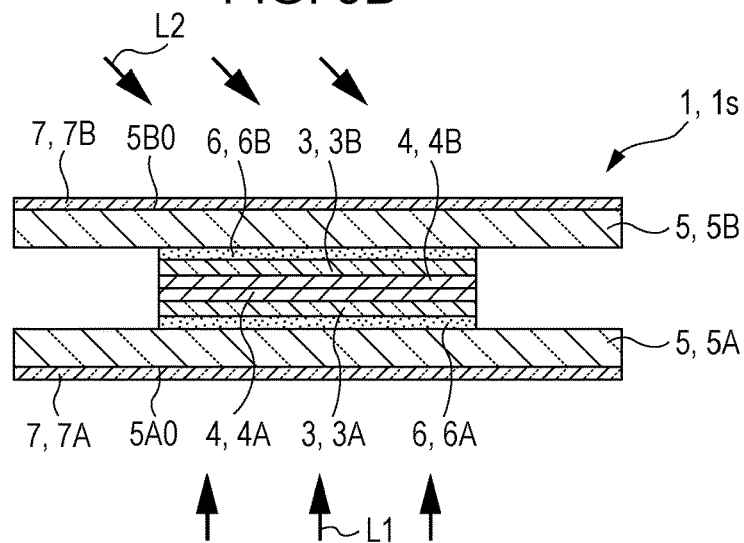
Figure 9C:
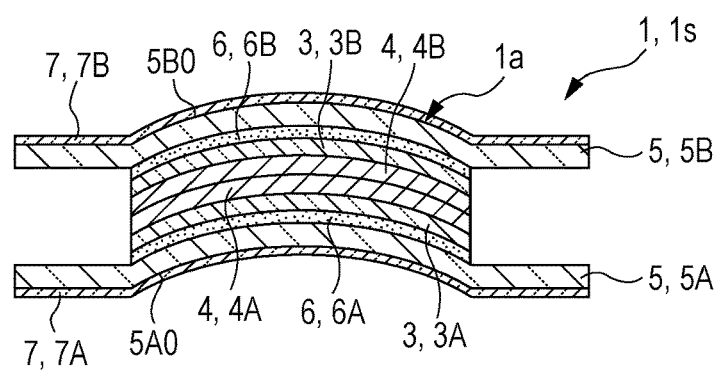

FIGS. 9A to 9C are explanatory diagrams illustrating a volume holographic element 1 according to a fifth embodiment. FIG. 9A is an explanatory diagram illustrating a method of laminating respective layers in the volume holographic element 1, FIG. 9B is an explanatory diagram illustrating the lamination structure of the volume holographic element 1, and FIG. 9C is an explanatory diagram illustrating the volume holographic element 1 according to a modification example.

Approximately similarly to the second embodiment, in the volume holographic element 1 according to the embodiment, a holographic material layer 4, on which diffraction grids are formed, a translucent film 3, which comes into contact with the holographic material layer 4, a translucent substrate 5, and a translucent adhesion layer 6 which cause the film 3 to adhere to the substrate 5 are laminated in order that is symmetric in the thickness direction, as illustrated in FIG. 9B. More specifically, the volume holographic element 1 according to the embodiment includes a first adhesion layer 6A and a second adhesion layer 6B as the adhesion layer 6, includes a first film 3A and a second film 3B as the film 3, includes a first substrate 5A and a second substrate 5B as the substrate 5, and includes a first holographic material layer 4A and a second holographic material layer 4B as the holographic material layer 4. Therefore, in the volume holographic element 1, the first adhesion layer 6A, the first film 3A, the first holographic material layer 4A, the second holographic material layer 4B, the second film 3B, and the second adhesion layer 6B are sequentially laminated between the first substrate 5A and the second substrate 5B from the side of the first substrate 5A toward the side of the second substrate 5B. In the embodiment, the first holographic material layer 4A and the second holographic material layer 4B forms the integrated holographic material layer 4, and diffraction grids, which include interference fringes, are formed in the holographic material layer 4. Here, a translucent anti-reflective layer 7 (first anti-reflective layer 7A) is laminated on the side of the first surface 5A0 of the first substrate 5A, which is a surface opposite to the holographic material layer 4. In addition, a translucent anti-reflective layer 7 (second anti-reflective layer 7B) is laminated on the side of a second surface 5B0 of the second substrate 5B, which is a surface opposite to the holographic material layer 4.

In the process of manufacturing the volume holographic element 1 according to the embodiment, the protection sheet 8 is separated from the material sheet 9, in which the holographic material layer 4 in the uncured state or the semi-cured state and the protection sheet 8 are laminated on one surface of the translucent film 3, in the dark room, as illustrated in FIGS. 1A and 1B. Here, the holographic material layer 4, which is acquired before curing, has adhesiveness.

Accordingly, in the lamination process, the films 3 are stuck to each other through the holographic material layer 4, as illustrated in FIG. 9A. More specifically, the film 3 (first film 3A), which includes the holographic material layer 4 (first holographic material layer 4A) on one surface, includes the other surface which is stuck to one surface of the first substrate 5A through the adhesion layer 6 (first adhesion layer 6A). In contrast, another film 3 (second film 3B), which includes the holographic material layer 4 (second holographic material layer 4B) on one surface, includes the other surface which adheres to one surface of the second substrate 5B by another adhesion layer 6 (second adhesion layer 6B). Subsequently, the first film 3A is stuck to the second film 3B through the holographic material layer 4 (the first holographic material layer 4A and the second holographic material layer 4B).

Subsequently, in the interference exposure process, the interference exposure is performed in such a way that the holographic material layer 4 (first holographic material layer 4A and the second holographic material layer 4B) of the laminated body 1s is irradiated with the object light L1 and the reference light L2 acquired by dividing the light flux, which is emitted from the common light source, and thus interference exposure is performed in the holographic material layer 4 (first holographic material layer 4A and the second holographic material layer 4B), as illustrated in FIG. 9B.

Subsequently, in the curing process, ultraviolet ray irradiation, heating, or the like is performed on the holographic material layer 4, and the holographic material layer 4 (the first holographic material layer 4A and the second holographic material layer 4B) is cured. As a result, the volume holographic element 1 is manufactured.

In the volume holographic element 1, which has the above configuration, similarly to the first embodiment, it is difficult that a situation, in which the reference light L2 is reflected in the first surface 5A0 of the first substrate 5A in the oblique direction, occurs. In addition, it is difficult that a situation, in which the object light L1 is reflected in the second surface 5B0 of the second substrate 5B in the direction which is deviated from the vertical direction, occurs. Accordingly, since it is possible to suppress the generation of interference fringes in locations other than the predetermined location of the holographic material layer 4, there is an effect which is similar to the first embodiment, that is, it is possible to suppress the deterioration in diffraction characteristics due to unnecessary interference fringes.

In addition, in the volume holographic element 1 according to the embodiment, the holographic material layer 4, the film 3, the adhesion layer 6, and the substrate 5 are laminated in order that is symmetric on one side and the other side of the thickness direction for the center (holographic material layer 4) of the volume holographic element 1 in the thickness direction. Therefore, similarly to the second embodiment, even though expansion or contraction is generated in the holographic material layer 4 and stress is added to the volume holographic element 1 when the holographic material layer 4 is exposed or when the holographic material layer 4 is cured, the stress is cancelled out on one side and the other side of the thickness direction for the center of the volume holographic element 1 in the thickness direction. Accordingly, it is possible to suppress the bending of the volume holographic element 1. Therefore, it is possible to appropriately form the diffraction grids in the volume holographic element 1.

Meanwhile, approximately similarly to the first modification example of the first embodiment, in the embodiment, the embodiment may be applied to a case in which the bending section 1a, in which the first substrate 5A, the first adhesion layer 6A, the first film 3A, the first holographic material layer 4A, the second holographic material layer 4B, the second film 3B, the second adhesion layer 6B, and the second substrate 5B are bent on one side of the thickness direction, is provided, as illustrated in FIG. 9C. In addition, in the embodiment, the configurations described in the second and third modification examples of the first embodiment may be used.

Other Embodiment

In the embodiment, the reference light L2 is irradiated from the side of the second substrate 5B in the oblique direction and the object light L1 is vertically irradiated from the side of the first substrate 5A. However, the embodiment may be applied to a case in which the object light L1 is irradiated from the side of the second substrate 5B in the oblique direction and the reference light L2 is vertically irradiated from the side of the first substrate 5A. In addition, the embodiment may be applied to a case in which both the object light L1 and the reference light L2 are irradiated from the side of the second substrate 5B in the oblique direction.

Configuration Example of Display Device

Figure 10A:
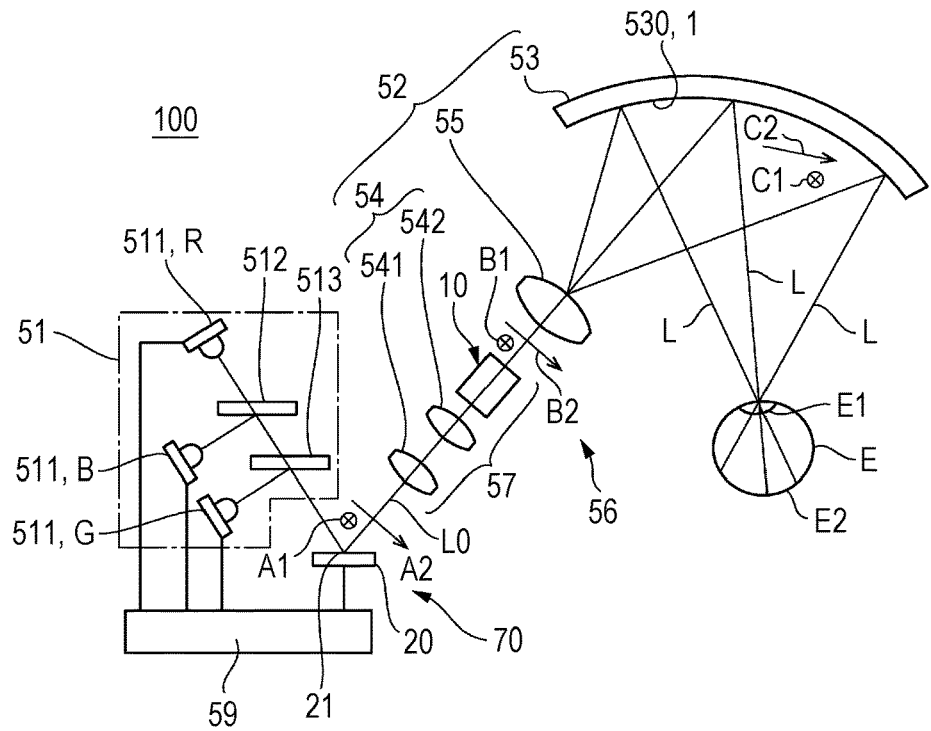
FIGS. 10A and 10B are explanatory diagrams illustrating one embodiment of a retina scanning type display device to which the embodiment is applied.
Figure 10B:
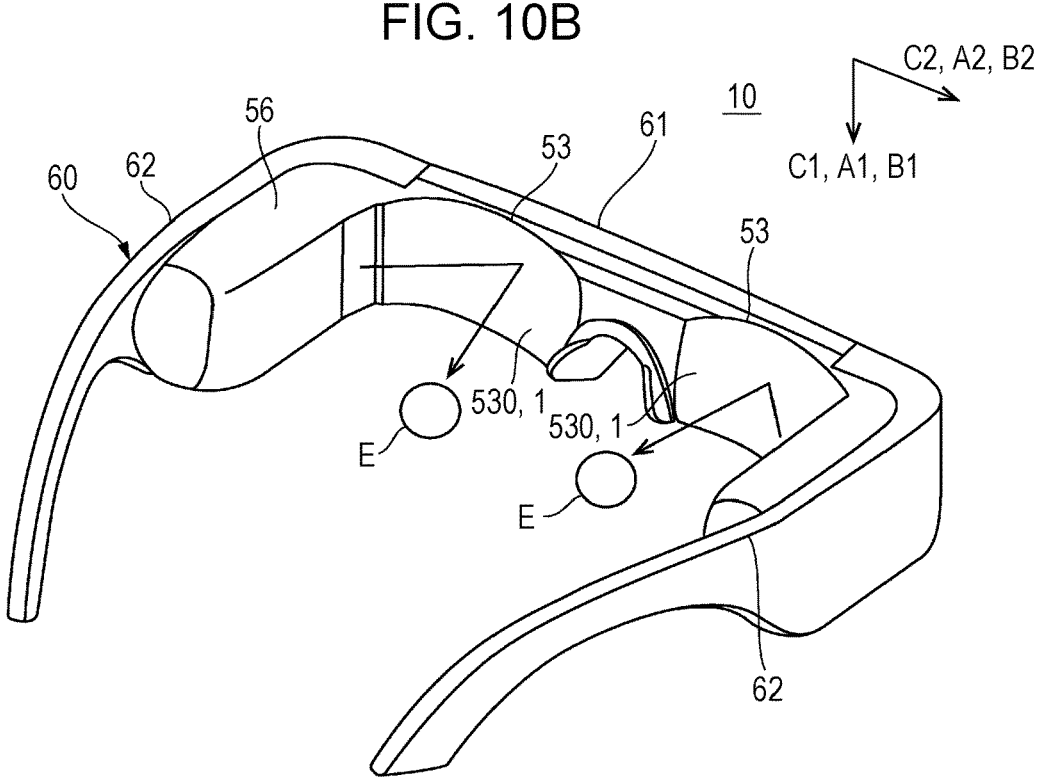

FIGS. 10A and 10B are explanatory diagrams illustrating an aspect of a display device 100 which includes the volume holographic element 1 to which the embodiment is applied. FIG. 10A is an explanatory diagram illustrating an aspect of an optical system, and FIG. 10B is an explanatory diagram illustrating an aspect of the appearance of the display device 100, respectively.

In FIG. 10A, the display device 100 includes a light source section 51 that emits light flux for displaying an image, and an optical scanning system 20 that includes a scanning mirror 21 which scans light flux emitted from the light source section 51 and converts into an image, a light guiding system 52 that causes light flux L0, which is scanned by the optical scanning system 20, to be incident into the eye E of an observer. In the embodiment, the light guiding system 52 includes a relay lens system 54, a projection lens system 55, and a deflection member 53 on an emission side from the optical scanning system 20. The relay lens system 54 includes, for example, two lenses 541 and 542. In the embodiment, the relay lens system 54 includes an afocal optical system.

The light source section 51 emits light source light, which is acquired before light modulation is performed, or modulated light on which light modulation is performed. In the embodiment, the light source section 51 is formed as a modulated light emission section that emits the modulated light on which light modulation is performed. More specifically, the light source section 51 includes a red laser element 511(R) that emits red light (R), a green laser element 511(G) which emits green light (G), and a blue laser element 511(B) that emits blue light (B), as light sources. The light source section 51 further includes two half mirrors 512 and 513 that synthesize the optical paths of the laser elements. The red laser element 511(R), the green laser element 511(G) and the blue laser element 511(B) emit light flux which is modulated to light intensity corresponding to the each of the dots of an image to be displayed under the control of a control section 59.

The optical scanning system 20 scans incident light in a first scanning direction A1, and a second scanning direction A2 which crosses the first scanning direction A1, and generates an image. Accordingly, in the embodiment, the image light generation device 70 is formed by the light source section 51 and the optical scanning system 20.

The light flux L0, which is emitted from the optical scanning system 20 of the image light generation device 70, is projected on the deflection member 53 through the relay lens system 54 and the projection lens system 55 in the light guiding system 52. The operation of the optical scanning system 20 is also performed under the control of the control section 59. It is possible to realize the optical scanning system 20 using, for example, a micro mirror device which is formed by a Micro Electro Mechanical System (MEMS) technology using a silicon substrate or the like.

In the embodiment, the display device 100 is formed as a projection type display device in a retina scanning manner. Therefore, the deflection surface 530 of the deflection member 53 deflects and emits the projected light flux L0, and causes the light flux L0 to be incident into the eye E of the observer as the light flux L. In the embodiment, in the deflection surface 530 of the deflection member 53, the volume holographic element 1, to which the embodiment is applied, is provided.

In the display device 100 (the projection type display device in the retina scanning manner), the optical scanning system 20 deflects the light flux L0 (image light), which is scanned in the first scanning direction A1 and the second scanning direction A2, which crosses the first scanning direction A1, in first incident direction C1 corresponding to the first scanning direction A1 and the second incident direction C2 corresponding to the second scanning direction A2 on the deflection surface 530 of the deflection member 53 (volume holographic element 1), and the light flux L0 (image light) reaches a retina E2 through the pupil E1, thereby causing a user to recognize the image. In the embodiment, the volume holographic element 1 is a partial reflection type holographic element, and the deflection member 53 is a combiner which has partial transmission and reflection characteristics. Therefore, light from outside is also incident into the eye through the deflection member 53 (combiner), and thus it is possible for the user to recognize an image, which is formed in the display device 100, and an image with which the light from outside (background) is overlapped. That is, the display device 100 is formed as a see-through retina scanning type projection device.

In addition, in the display device 100, a light flux diameter expanding element 10 using a diffraction element, which will be described later, is arranged in the optical path which reaches the deflection member 53 from the optical scanning system 20 (optical path which reaches the light guiding system 52 from the optical scanning system 20 or the optical path of the light guiding system 52). The light flux diameter expanding element 10 expands light flux, which is emitted from the optical scanning system 20, in at least one of a first expansion direction B1 corresponding to the first scanning direction A1 (first incident direction C1) and a second expansion direction B2 corresponding to the second scanning direction A2 (second incident direction C2).

When the display device 100, which is configured as described above, is configured as a see-through type head mounted display (eye glass display), the display device 100 is formed in a shape, such as glasses, as illustrated in FIG. 10B. In addition, when modulated light is incident into each of the left and right eyes E of the observer, the display device 100 includes a left eye deflection member 53 and a frame 60 which supports the left eye deflection member 53 using a fore part 61. Further, an optical unit 56, which includes optical components described with reference to FIG. 6A, is provided in each of the left and right temples 62 of the frame 60. Here, in the optical unit 56, all of the light source section 51, the optical scanning system 20, the relay lens system 54, the light flux diameter expanding element 10, and the projection lens system 55 are provided. In addition, in the optical unit 56, only the optical scanning system 20, the relay lens system 54, the light flux diameter expanding element 10, and the projection lens system 55 are provided, and the optical unit 56 and the light source section 51 may be connected through an optical cable or the like.

The entire disclosure of Japanese Patent Application No. 2015-068267, filed Mar. 30, 2015 is expressly incorporated by reference herein.

What is claimed is:

1. A volume holographic element, comprising:
    a first translucent substrate;
    a second translucent substrate that faces the first translucent substrate;
    a first holographic material layer that is arranged between the first translucent substrate and the second translucent substrate; and
    a first translucent anti-reflective layer that is arranged on a first surface of the first translucent substrate, the first surface being a surface opposite to the first holographic material layer,
    wherein the volume holographic element is bent on one side in a thickness direction.

2. The volume holographic element according to claim 1, further comprising:
    a second translucent anti-reflective layer that is arranged on a second surface of the second translucent substrate, the second surface being a surface opposite to the first holographic material layer.

3. The volume holographic element according to claim 2, wherein:
    the first holographic material layer, the first translucent substrate, and the second translucent substrate are bent on one side of a thickness direction.

4. The volume holographic element according to claim 1, further comprising:
    a first translucent film that is arranged between the second translucent substrate and the first holographic material layer; and
    a first translucent adhesion layer that is arranged between the second translucent substrate and the first translucent film.

5. The volume holographic element according to claim 1, further comprising:
    a second holographic material layer that is arranged between the second translucent substrate and the first holographic material layer; and
    a first translucent film that is arranged between the first holographic material layer and the second holographic material layer.

6. The volume holographic element according to claim 5, further comprising:
    a second translucent film that is arranged between the second holographic material layer and the first translucent film; and
    a first translucent adhesion layer that is arranged between the first translucent film and the second translucent film.

7. The volume holographic element according to claim 1, further comprising:
    a first translucent film that is arranged between the first translucent substrate and the first holographic material layer;
    a second translucent film that is arranged between the second translucent substrate and the first holographic material layer;
    a first translucent adhesion layer that is arranged between the first translucent substrate and the first translucent film; and
    a second translucent adhesion layer that is arranged between the second translucent substrate and the second translucent film.

8. The volume holographic element according to claim 7, further comprising:
    a second holographic material layer that is arranged between the first holographic material layer and the second translucent film.

9. A method of manufacturing a volume holographic element according to claim 1, the manufacturing method comprising:
   forming a laminated body in which the first translucent substrate, the first holographic material layer, and the second translucent substrate are sequentially arranged; and
   irradiating the first holographic material layer with at least one of object light and reference light from a side of the second translucent substrate,
   wherein:
   the first translucent substrate and the second translucent substrate are each bent on one side in the thickness direction, and
   the irradiating is performed in a state in which the first translucent anti-reflective layer is arranged on the first surface of the first translucent substrate, the first surface being a surface opposite to the first holographic material layer.

10. The volume holographic element manufacturing method according to claim 9,
   wherein, when the irradiating is performed, a second translucent anti-reflective layer is arranged on a second surface of the second translucent substrate, the second surface being a surface opposite to the first holographic material layer, and
   wherein, in the irradiating, the first holographic material layer is irradiated with one of object light and reference light from a side of the second translucent substrate, and the first holographic material layer is irradiated with the other light from a side of the first translucent substrate.

11. A display device comprising:
   an image light generation device; and
   a light guiding system that guides image light which is emitted from the image light generation device,
   wherein the light guiding system includes the volume holographic element according to claim 1.

12. The display device according to claim 11, further comprising:
   a second translucent anti-reflective layer that is arranged on a second surface of the second translucent substrate, the second surface being a surface opposite to the first holographic material layer.

13. The display device according to claim 11,
   wherein the light guiding system includes:
   an optical projection system that projects image light which is emitted from the image light generation device; and
   a deflection member that deflects the image light, which is projected from the optical projection system, toward eyes of an observer, and
   wherein the deflection member includes the volume holographic element.

14. A volume holographic element, comprising:
   a first translucent substrate;
   a second translucent substrate that faces the first translucent substrate;
   a first holographic material layer that is arranged between the first translucent substrate and the second translucent substrate;
   a first translucent film that is arranged between the second translucent substrate and the first holographic material layer;
   a first translucent adhesion layer that is arranged between the second translucent substrate and the first translucent film; and
   a first translucent anti-reflective layer that is arranged on a first surface of the first translucent substrate, the first surface being a surface opposite to the first holographic material layer.

15. A volume holographic element, comprising:
   a first translucent substrate;
   a second translucent substrate that faces the first translucent substrate;
   a first holographic material layer that is arranged between the first translucent substrate and the second translucent substrate;
   a second holographic material layer that is arranged between the second translucent substrate and the first holographic material layer;
   a first translucent film that is arranged between the first holographic material layer and the second holographic material layer; and
   a first translucent anti-reflective layer that is arranged on a first surface of the first translucent substrate, the first surface being a surface opposite to the first holographic material layer.

16. A volume holographic element, comprising:
   a first translucent substrate;
   a second translucent substrate that faces the first translucent substrate;
   a first holographic material layer that is arranged between the first translucent substrate and the second translucent substrate;
   a first translucent film that is arranged between the first translucent substrate and the first holographic material layer;
   a second translucent film that is arranged between the second translucent substrate and the first holographic material layer;
   a first translucent adhesion layer that is arranged between the first translucent substrate and the first translucent film;
   a second translucent adhesion layer that is arranged between the second translucent substrate and the second translucent film; and
   a first translucent anti-reflective layer that is arranged on a first surface of the first translucent substrate, the first surface being a surface opposite to the first holographic material layer.

* * * * *